July 15, 1947.  W. H. DU BOIS  2,423,881
DISK BRAKE
Filed July 4, 1942  3 Sheets-Sheet 1

INVENTOR
WILLIAM H. DU BOIS
BY M. W. McConkey
ATTORNEY

July 15, 1947. W. H. DU BOIS 2,423,881
DISK BRAKE
Filed July 4, 1942 3 Sheets-Sheet 3

INVENTOR
WILLIAM H. DU BOIS
BY M. W. McConkey
ATTORNEY

Patented July 15, 1947

2,423,881

UNITED STATES PATENT OFFICE 2,423,881

DISK BRAKE

William H. Du Bois, South Bend, Ind., assignor to Bendix Aviation Corporation, South Bend, Ind., a corporation of Delaware Application July 4, 1942, Serial No. 449,722

23 Claims. (Cl. 188—72)

This invention relates generally to brakes and more specifically to disk brakes. It is expected that the chief occasion for use of my invention will arise in connection with brakes for airplanes, but it will be obvious that the invention may be utilized with profit wherever the problems are similar to the problems of the airplane brake designer.

Owing to the high landing speeds of airplanes and the relatively short stopping distance after landing, the strain on the brakes is excessive. The chief problem is heat dissipation. As is well known, an overheated brake is ineffective, and an airplane brake is in danger of being overheated unless the area over which the stopping friction occurs is large. At the same time limitations as to space and weight of the brake mitigate against use of large diameter brake drums. To provide a large friction area in a relatively small diameter wheel, I have found it desirable to use a disk brake, preferably of the multiple disk type.

However, the use of a disk brake for an airplane where the brake-developed heat is excessive has developed certain very troublesome disadvantages. The heat often causes certain of the metal members of the brake to warp and eventually to develop a wavy or undulating friction surface. This lessens the friction area and throws the whole brake assembly out of alignment. The effect of heat and warping can also cause the disk to assume a concave, or "dished" shape with the same undesirable results. In a drum type brake the shoes are not subject to the effects of warping and moreover the shoes and drum always maintain their friction surfaces approximately in parallel curved planes regardless of drum distortion due to heat. Since the plane of contact of the friction members of a disk brake is annular rather than cylindrical, the effect of heat distortion is of relatively great importance.

Considering the stator and rotor elements of a disk brake as separate units, one may be formed of a metal backing faced with a lining of material having a particularly high coefficient of friction, while the other may be formed as a metal piece having direct contact with the lining on the other unit. The lining serves as a fairly effective insulator, so that the heat absorption of the unit which is lined with friction material is relatively slight. The unlined unit is the one subjected to the full fury of the heat developed and it is the one likely to warp and lose its effectiveness as a contributor to the brake effort.

It is the chief object of my invention to provide a disk brake having its component parts so formed and arranged that excessive heat or great changes in temperature will not have an injurious effect on the brake or its parts. To this end, I have conceived the possibility of using a segmented disk as either the stator or rotor, depending upon the positioning of the lining material. It is my intention to form as a segmented annulus or disk the brake part or parts which is or are unlined.

The result of any differential in heat between various parts of an annular disk or of an expansion of the inside and outside diameters of the disk which is not uniform will be to set up thermal stresses in the disk which tend to warp it and destroy the evenness of its friction surface. Instead of having a solid annular disk or ring which is subjected to extensive warpage when heated due to thermal stresses, I have broken the ring or disk into a plurality of separated segments to relieve the stresses.

My invention is embodied, for purposes of illustration, in a disk brake having a friction lined stator, a segmented rotor having allowance for the expansions and subsequent contractions of the segments, and supporting means for maintaining the rotor segments in their proper radial and circumferential positions.

My invention might also be embodied in a disk brake having all its friction surfaces unlined, thus providing for metal to metal contact of the disks. In such a case either the rotors or stators, or possibly both, might be divided into segments.

It is an important feature of my invention that the segments of the unlined or metal disk are formed as entirely separate or disconnected units. The supporting means for preventing radial or circumferential displacement while allowing circumferential and in some cases radial expansion of the segments, will serve to position the segments relative to one another, but it will not fully join the segments one to another, so that the segments cannot be considered as being a single or integrated part. This is important because any member which served to integrate the segments would itself be subject to warping and would be capable of throwing the segments out of line. In the field of airplane brakes, it is possible to use segments which are entirely disconnected except for a separate supporting member or members because of the short running time of the wheels. Exact alignment of the segments so that their friction surfaces lie on the same plane is not critical in airplane brakes as it might be in the brakes of ground vehicles, where the brake members must run free except when pressure is applied to cause friction. While a plane is in the air, the wheels are not turning, and slight misalignment of the segments is of little consequence.

In line with the provision of disk segments which are completely disconnected from one another, I have found it desirable to use a relatively strong and heavy segment for durability and resistance to distortion.

Use of the segmented disk has two important advantages: (1) it tends, as already pointed out, to prevent warping and distortion of the disk, and (2) it minimizes the effect of any warping or distortion which occurs, this minimizing resulting from the relative smallness of each segment and the impossibility of large distortions occurring in such relatively small members.

Other objects, features and advantages will become apparent during the course of the following description. In the drawings, wherein certain embodiments of my invention are illustrated:

Figure 1:
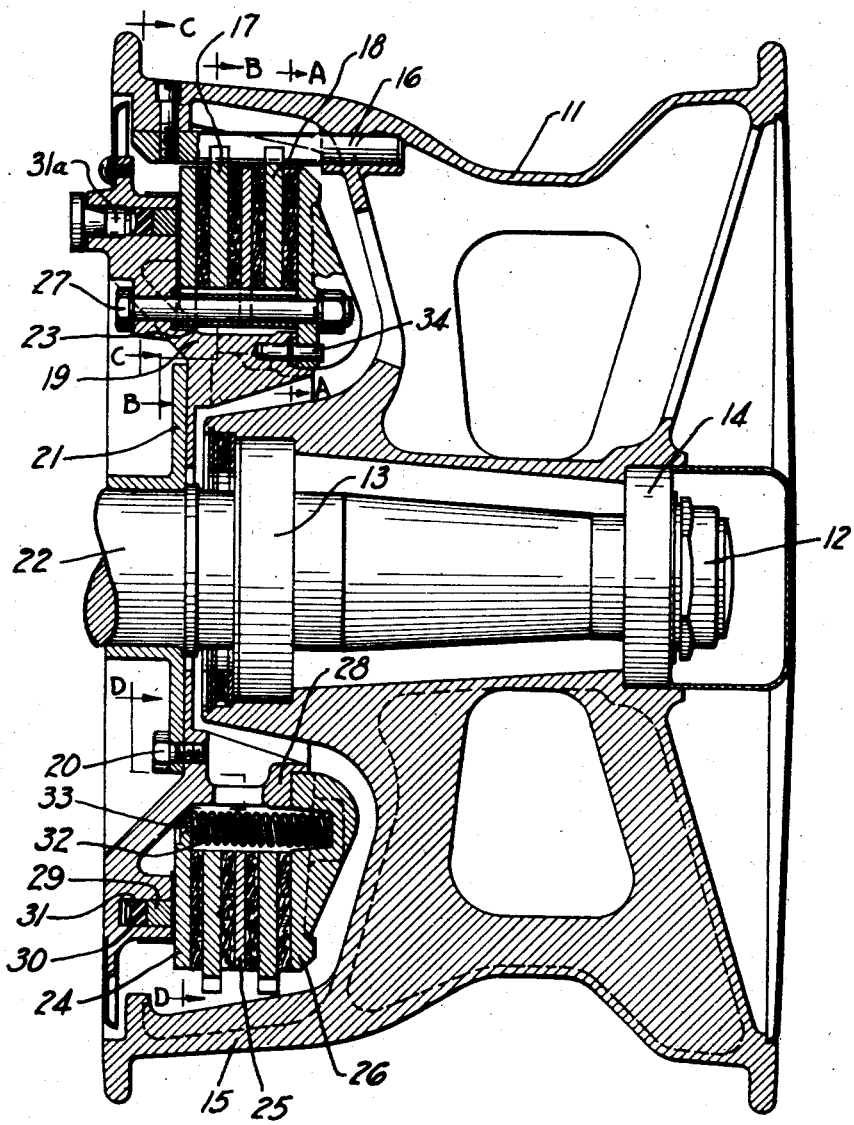
Figure 1 is a vertical section taken through a wheel, axle and brake assembly having a brake of a type incorporating my invention.
Figure 2:
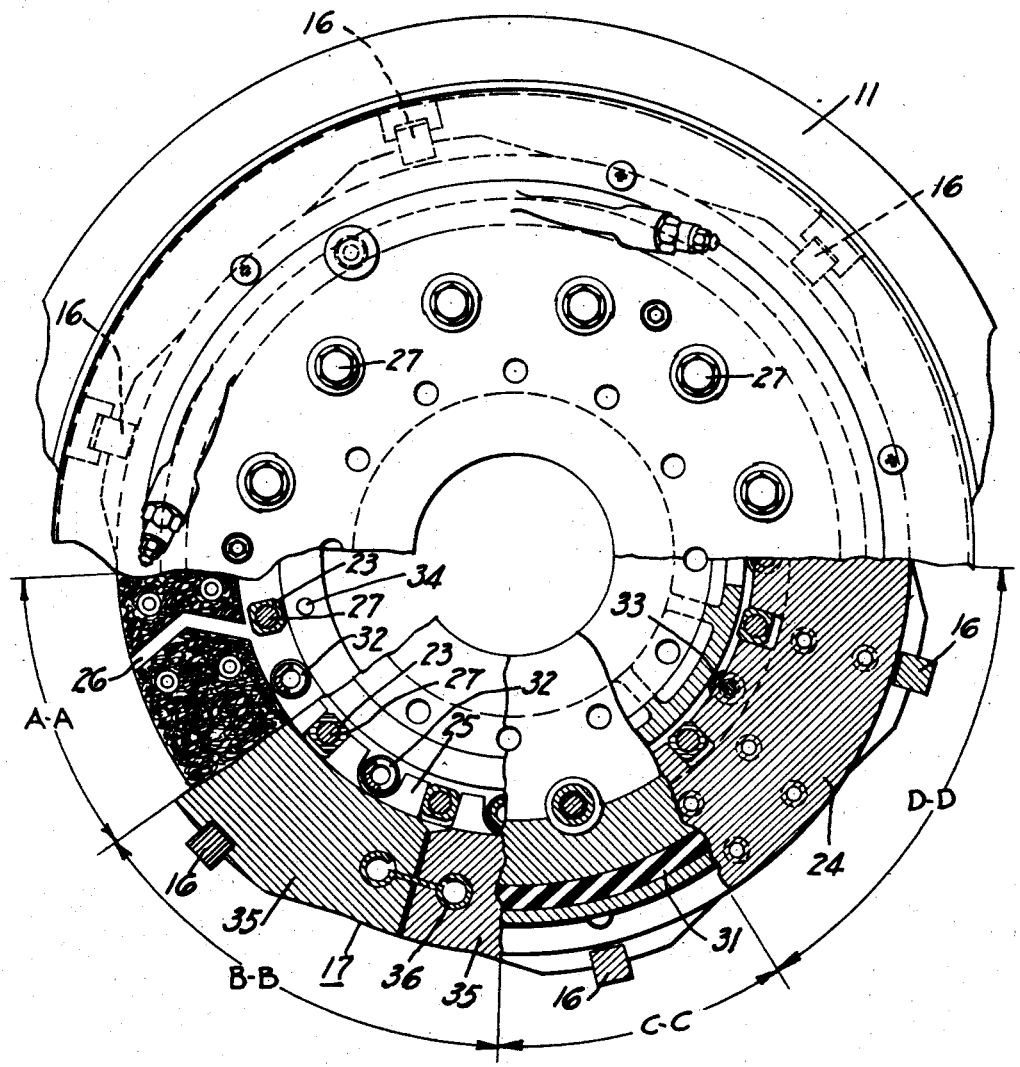
Figure 2 is a composite vertical side view of the wheel and brake assembly taken from a position facing the annular friction surfaces of the disks and showing in various sectors of a complete circle the outside of the backing plate or fixed support for the brake applying means, and partially broken-away sections taken on the lines A—A, B—B, C—C, and D—D, respectively, of Figure 1.

The disk brake assembly of Figures 1 and 2 comprises, in general, a wheel 11 rotatably mounted on a non-rotatable spindle 12, the friction of rotation being minimized by bearings 13 and 14. The wheel 11 has an axially extending flange 15 which has keyed thereto for rotation therewith, by means of a plurality of circumferentially spaced cross bars, or torque-sustaining keys, 16, rotors 17 and 18. The rotors 17 and 18 comprise the rotating disks of my improved disk brake and are adapted to be brought into contact with stationary disks supported by a supporting member 19 which is mounted by a plurality of bolts 20 on a flange 21 which forms an integral part of the spindle-carrying non-rotatable axle 22. The supporting member 19 has a plurality of circumferentially spaced hollow bars, or torque-sustaining keys, 23 which serve to support stationary disks 24, 25, and 26 to maintain said disks against rotation and take the torque thereof during the time they are in contact with the rotatable disks 17 and 18. Bolts 27 extending through the hollow bars 23 firmly hold plate 26 in position against a stationary cylindrical flange 28 of the supporting member 19. The disks 24 and 25 are keyed to the bars 23 so that they are incapable of circumferential or rotating movement relative to the bars, but they are capable of lateral or axial movement along the length of the bars. The rotating disks 17 and 18 are likewise capable of lateral or axial movement along the length of the bars 16, said bars extending into notches or grooves in the periphery of the disks. The non-rotatable disks 24, 25 and 26 are shown as carrying friction lining, preferably non-metal. Disk 24 has lining secured thereto on the side facing disk 17. Disk 25 has lining on both sides thereof facing disks 17 and 18, and disk 26 has lining on the side thereof facing disk 18. The lining may be secured to the disks by any preferred means. As shown it is riveted thereto (see sections A—A and D—D, Figure 2). Bearing against disk 24 is an annular piston 29 reciprocable in an annular chamber 30 which is formed in the supporting member 19. An annular resilient seal 31 is provided in the chamber 30 to prevent loss of fluid.

Admission of hydraulic fluid under pressure through an opening 31a into chamber 30 causes movement of piston 29 in a direction to move the various disks into contact with one another. Axial movement of disk 24 toward the right, as seen in Figure 1, brings it into frictional contact with disk 17, which in turn moves axially against disk 25, said disk 25 then pressing disk 18 between it and the fixed disk 26. The frictional force between the rotating and non-rotating disks causes the torque of the rotating wheel 11 to be transmitted to the stationary supporting member 19, the wheel being eventually brought to a stop. A plurality of circumferentially spaced springs 32, positioned by pins 33, yieldingly maintain pressure on disk 24 in released position. This allows the various disks to seek and maintain during brake release a position in which they are not in frictional contact with their neighboring disks. A plurality of circumferentially spaced pins 34 serve to aid the bolts 27 in maintaining fixed plate 26 against rotation.

Each of the rotors 17 and 18 is composed of a plurality of segments 35 (see section B—B, Figure 2). These segments are individually constrained to rotate by the bars or torque-sustaining members 16, and are connected together only by spring members or slightly resilient links or ties 36 which have one enlarged end extending into and retained in an opening or socket in one segment and the other enlarged end extending into and retained in a complementary opening or socket in the next segment. Since the tie members 36 tend to hold the adjacent segments 35 apart and to maintain a slight clearance between the segments, they also prevent radial displacement of the segments. This is true since radially inward movement of the segments would require that they move circumferentially toward one another. Outward movement is prevented both by spring members 36 and bars 16. The clearance between the segments 35 is maintained at a sufficient amount so that expansion in the segments owing to excessive heat in the brake may be taken up by said clearance without causing the disks to warp or the circumferentially spaced parts thereof to get out of alignment axially. Also, as explained above, the smallness of the segments 35 minimizes the effect of changes that may occur in them owing to temperature changes. As will be seen with reference to section A—A of Figure 2, the lining on the stator disks is also segmented. This serves two purposes. It prevents, as in the case of the segmented rotor disks, cracking of the lining owing to expansion caused by excessive heat, and it also forms a passage between the lining segments which allows a cooling flow of air through the brake.

Figure 3:
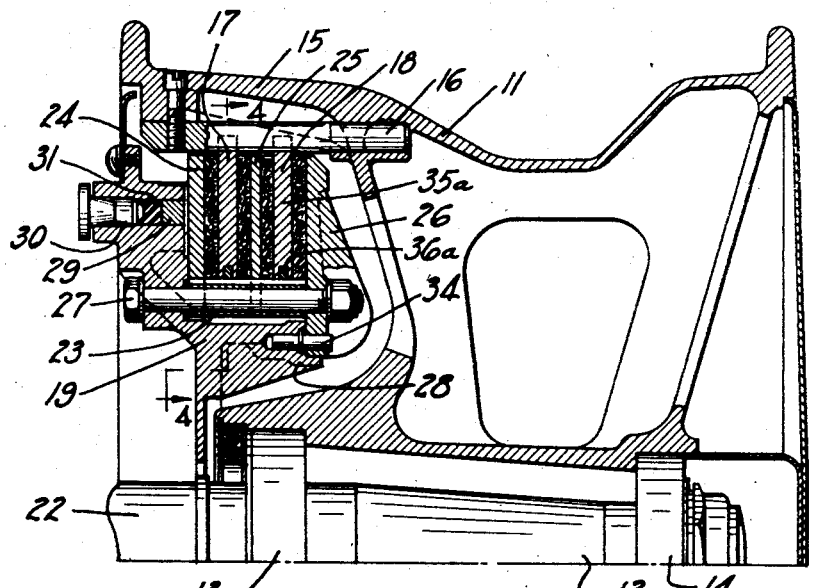
Figure 3 shows a modification of the brake of Figures 1 and 2.
Figure 4:
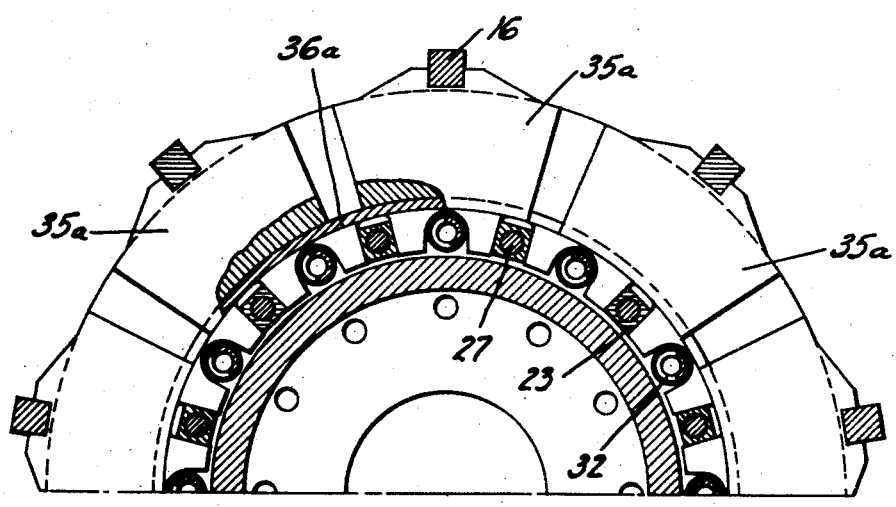
Figure 4 is a section, partially broken-away, taken on the line 4—4 of Figure 3.

In Figures 3 and 4 are shown a modification of the brake of Figures 1 and 2. In this modification, I have mounted the segments 35a of the rotor disks in circumferentially spaced positions upon an annular retaining ring 36a. This ring serves to support the disks of the segments 35a and to prevent them from radial movement toward the center of the brake. At the same time it allows them to expand circumferentially under the influence of excessive heat.

While I have shown and described certain specific embodiments of my invention, it will be apparent that, without departing from the scope thereof, many other embodiments might be made. It is therefore my intention that the scope of my invention be limited, not by the illustration and description, but only by the terms of the appended claims.

I claim:
1. A disk brake having a stator member and a rotor member, one of which consists of a metallic backing portion and friction lining material secured thereto which serves to partially insulate the metallic portion from the braking heat, and the other of which is an unlined metallic member composed of a plurality of separate segments, and means acting on said segments to prevent radial movement thereof without interference with their expansion when heated.

2. A disk brake having a stator member and a rotor member which have flat annular surfaces adapted to engage one another for causing friction, one of said members being lined with a substantially non-metallic material which serves as a partial insulator for the lined member, and the other of said members being unlined and being composed of a plurality of separate segments.

3. A disk brake comprising a stator member and a rotor member, one of which consists of a metallic backing portion and friction lining material secured thereto which serves to partially insulate the metallic portion from the braking heat, and the other of which is an unlined metallic member composed of a plurality of separate segments, and a plurality of tie members connecting the adjacent segments and preventing any substantial radial or circumferential displacement of said segments while allowing their expansion in case of excessive heat.

4. A disk brake comprising a stator member and a rotor member, one of which consists of a metallic backing portion and friction lining material secured thereto which serves to partially insulate the metallic portion from the braking heat, and the other of which is an unlined metallic member composed of a plurality of separate segments, and a retaining ring which engages the inner edges of the segments to prevent radial displacement of the segments toward the center of the brake.

5. A disk brake comprising a stator member and a rotor member, one of which is composed of a plurality of separate segments, and a retaining ring which engages the inner edges of the segments to prevent radial displacement of the segments toward the center of the brake.

6. A wheel having key elements extending in the direction of its axis, an adjacent support having similar axially extending key elements, brake disks engageable with each other axially and keyed on said elements, at least one of said disks comprising separate segments, each drivably engaging a single one of said elements.

7. A disk brake comprising a plurality of interengageable disks at least one of which is formed in separate segments having a single driving member for each segment, and positioning means engaging the segments separately from said driving means to restrain the segments from moving radially inwardly toward the center of the brake.

8. A wheel and brake assembly comprising a rotatable wheel, a plurality of circumferentially spaced driving keys rotatable with said wheel and substantially parallel to the axis thereof, a brake rotor comprising a plurality of separate segments arranged in end-to-end relationship to constitute substantially a full disk, each of said segments having a notch across the periphery thereof receiving one of said driving keys in order that each segment will be individually driven, a brake stator comprising a disk engageable with the rotor and prevented from rotation by engagement with a non-rotatable member, and a plurality of links lying in the plane of the rotor disk and each having one end retained in a socket formed in one segment and the other end retained in a socket formed in the next segment.

9. A wheel and brake assembly comprising a rotatable wheel, a plurality of circumferentially spaced driving keys rotatable with said wheel and substantially parallel to the axis thereof, a plurality of brake rotors each comprising a plurality of separate segments arranged in end-to-end relationship to constitute substantially a full disk, each of said segments having a notch across the periphery thereof receiving one of said driving keys in order that each segment will be individually driven, a plurality of brake stators engageable with the rotors and prevented from rotation by anchoring on a non-rotatable member, and a plurality of links lying in the plane of each rotor disk and each having one end retained in a socket formed in one segment and the other end retained in a socket formed in the next segment, said links serving to maintain the segments in assembled relation and to prevent cocking of said segments by opposing the radial twisting tendency of the segments in both directions of wheel rotation.

10. A disk brake having a stator disk and a rotor disk, one of which is unlined and is composed of a plurality of separate segments having their adjacent ends spaced apart for a distance sufficient to allow for thermal expansion of the disk, and the other of which is lined with a material having a thermal conductivity appreciably lower than that of the unlined disk.

11. A disk brake comprising a stator disk and a rotor disk, one of which consists of a backing portion and friction lining material secured thereto which serves to partially insulate the backing portion from the braking heat, and the other of which is an unlined member composed of a plurality of separate segments having their adjacent ends spaced apart for a distance sufficient to allow for thermal expansion of the disk, and means lying in the plane of said segments and engaging the same for assembling and retaining them in disk form.

12. In a brake, a friction disk composed of a plurality of separate sections spaced to permit substantially unrestricted individual expansion of the sections as the temperature rises, each of said sections having an opening extending a short distance inwardly from each end and terminating in a socket-like portion, and a plurality of tie members interconnecting adjacent sections to retain the same in assembled disk form, each of said tie members having enlarged flexible end portions fitting into the socket-like openings in the adjacent ends of two adjacent sections.

13. In a brake, a friction disk composed of a plurality of separate sections spaced to permit substantially unrestricted individual expansion of the sections as the temperature rises, each of said sections having an opening extending a short distance inwardly from each end and terminating in a socket-like portion, and a plurality of tie members interconnecting adjacent sections to retain the same in assembled disk form, each of said tie members having end portions bent to form incomplete rings fitting into the socket-like openings in the adjacent sections and adapted to flex as the sections expand.

14. In a wheel and brake assembly having a plurality of axially extending keys, a friction disk comprising a plurality of separate segments having their adjacent ends spaced apart for a distance sufficient to allow for thermal expansion of the disk, each of said segments having a notch through which one of said keys extends to provide driving force for the segment while allowing the segment to slide axially along the key, and a plurality of members loosely interconnecting adjacent segments to permit free individual expansion of said segments while retaining them in disk form.

15. In a wheel and brake assembly having a plurality of axially extending torque-sustaining members, a friction disk comprising a plurality of separate segments having their adjacent ends spaced apart for a distance sufficient to allow for thermal expansion of the disk, each of said segments having a notch through which one of said torque-sustaining members extends, said torque-sustaining members restraining said segments from moving radially in one direction, and means independent of said torque-sustaining members restraining said segments from moving radially in the opposite direction.

16. For use in a wheel and brake assembly having a plurality of axially extending torque-sustaining keys, a friction disk comprising a plurality of separate segments, each of said segments having a notch adapted to receive one of said keys in order that the segment will be driven by its key without preventing axial sliding movement of he segment along the key, and a plurality of members loosely interconnecting adjacent segments to retain them in disk form during the assembling and disassembling of the brake.

17. A wheel having key elements extending in the direction of its axis, an adjacent support having similar axially extending key elements, brake disks engageable with each other axially and keyed on said elements, at least one of said disks comprising separate segments, each drivably engaging a single one of said elements, said segments having their adjacent ends spaced apart for a distance sufficient to allow for thermal expansion of the disk.

18. A wheel and brake assembly comprising a rotatable wheel, a plurality of circumferentially spaced driving keys rotatable with said wheel and extending substantially parallel to the axis thereof, a brake rotor comprising a plurality of separate segments arranged in end-to-end relationship to constitute substantially a full disk, each of said segments having a notch across the periphery thereof receiving one of said driving keys in order that each segment will be individually driven, a brake stator comprising a disk engageable with the rotor and prevented from rotation by engagement with a non-rotatable member, and means lying in the plane of the rotor disk for assembling the segments in disk form.

19. A wheel and brake assembly comprising a rotatable wheel, a plurality of circumferentially spaced driving keys rotatable with said wheel and extending substantially parallel to the axis thereof, a brake rotor comprising a plurality of separate segments arranged in end-to-end relationship to constitute substantially a full disk, each of said segments having a notch across the periphery thereof receiving one of said driving keys in order that each segment will be individually driven, a brake stator comprising a disk engageable with the rotor and prevented from rotation by engagement with a non-rotatable member, and a plurality of links lying in the plane of the rotor disk and each having one end retained in a socket formed in one segment and the other end retained in a socket formed in the next segment, said links serving to maintain the segments in disk form and to prevent cocking of said segments by opposing the radial twisting action of the segments.

20. In a wheel and brake assembly having a plurality of axially extending torque-sustaining members, a friction disk comprising a plurality of separate segments having their adjacent ends spaced apart for a distance sufficient to allow for thermal expansion of the disk, each of said segments having a notch through which one of said torque-sustaining members extends, and means for assembling said segments in disk form comprising a plurality of members lying in the plane of the disk and interconnecting the segments to retain the same against relative radial movement while permitting relative lateral aligning movement, said members serving to prevent cocking of said segments by opposing the radial twisting action thereof.

21. A friction member for disc brakes, and the like, comprising an interrupted disc member composed of contiguous disc sections having their adjacent ends spaced apart for a distance sufficient to allow for thermal expansion of the disc, and means for assembling said sections in disc form, with the ends of said sections spaced as aforesaid, said means being disposed in coplanar relation to and loosely extending into the disc sections between the adjacent end faces of the respective sections to thereby permit of relative movement of the disc sections with respect to each other.

22. A friction member for disk brakes and the like, comprising an interrupted disc member composed of contiguous disc sections having their adjacent ends spaced apart for a distance sufficient to allow for thermal expansion of the disc, and means for assembling said sections in disc form, with the ends of said sections spaced as aforesaid, said last-named means comprising connecting plugs extending between the adjacent end faces of the disc sections and permitting relative movement thereof.

23. A friction member for disc brakes and the like, comprising an interrupted disc member composed of contiguous disc sections having their adjacent ends spaced apart for a distance sufficient to allow for thermal expansion of the disc, and means for assembling said sections in disc form, with the ends of said sections spaced as aforesaid, said last named means comprising insert means extending between the adjacent end faces of the disc sections and into recesses formed therein.

WILLIAM H. DU BOIS.

REFERENCES CITED

The following references are of record in the file of this patent:

UNITED STATES PATENTS

| Number | Name | Date |
| --- | --- | --- |
| 795,974 | Hele-Shaw | Aug. 1, 1905 |
| 2,303,201 | Eason | Nov. 24, 1942 |
| 1,803,430 | Hand | May 5, 1931 |
| 2,021,266 | Shelor | Nov. 19, 1935 |
| 2,259,461 | Eason | Oct. 21, 1941 |